United States Patent
Brabson (10) Patent No.: US 6,185,618 B1
(45) Date of Patent: Feb. 6, 2001

(54) METHOD AND APPARATUS FOR SUPPORTING DEPENDENT LOGICAL UNITS IN ADVANCED PEER-TO-PEER NETWORKS WITH BRANCH EXTENDERS

(75) Inventor: Roy F. Brabson, Raleigh, NC (US)

(73) Assignee: International Business Machines Corp., Armonk, NY (US)

( * ) Notice: Under 35 U.S.C. 154(b), the term of this patent shall be extended for 0 days.

(21) Appl. No.: 09/183,122

(22) Filed: Oct. 30, 1998

(51) Int. Cl.⁷ ....................................... G06F 15/16
(52) U.S. Cl. .................. 709/228; 709/219; 709/225; 709/238; 709/241; 709/242
(58) Field of Search ................. 709/219, 225, 709/228, 238, 241, 242

(56) References Cited

U.S. PATENT DOCUMENTS

| 5,586,261 | * | 12/1996 | Brooks et al. | 709/238 |
| 5,745,680 | * | 4/1998 | Brooks et al. | 709/227 |
| 5,802,053 | * | 9/1998 | Bollella et al. | 370/401 |
| 5,802,313 | * | 9/1998 | Mitchell et al. | 709/238 |

OTHER PUBLICATIONS

IBM technical disclosure bulletin, Nov. 1, 1996, U.S. "Supporting advanced Peer–to–Peer Networking Sesson Services Extensions Protocols over non–Systems Network Architecture Transport Networks".*

* cited by examiner

Primary Examiner—Zarni Maung
Assistant Examiner—Saleh Najjar
(74) Attorney, Agent, or Firm—Jerry W. Herndon (57) ABSTRACT

In an APPN network having a dependent LU server (DLUS) and a dependent LU requester (DLUR), a method and apparatus that allows the DLUR to reside in an end node served by a branch extender node. The DLUS is forced to view the DLUR as residing in a different network, even though this is not the reality. This forces the DLUS to initiate a resource Locate search request to determine routes to the DLUR, rather than relying on registered DLUR trunk group vectors, which are erroneous when the DLUR is located downstream of a branch extender. In addition, the branch extender examines resource Locate request and resource Locate replies to determine if the resource being sought is a DLU. If it is, then the branch extender does not substitute itself as the owner of the DLU in the Locate requests and replies. This prevents the occurrence of both the branch extender and the DLUR reporting ownership of a DLU.

7 Claims, 7 Drawing Sheets

METHOD AND APPARATUS FOR SUPPORTING DEPENDENT LOGICAL UNITS IN ADVANCED PEER-TO-PEER NETWORKS WITH BRANCH EXTENDERS

TECHNICAL FIELD

The invention relates to the fields of networking and route calculation, and specifically to the problem of allowing support of dependent logical units (DLU) in a SNA (System Network Architecture) Advanced-Peer-to-Peer Architecture (APPN) environment to be located downstream of a branch extender and still have the network function properly as to locating of the DLUs, route calculation to and communication with the DLUs.

BACKGROUND OF THE INVENTION

IBM's Advanced Peer-to-Peer Architecture (APPN) provides networking between nodes of a network on a peer-to-peer basis. That is, all nodes are able to communicate amongst themselves on an equal basis, without regard to any hierarchical network structure. An APPN network contains network nodes (NNs) and end nodes (Ens). A network node contains all of the functionality to initiate control point sessions with other network nodes, to locate resources within the network and to calculate routes to other nodes. Control point (CP) sessions are sessions over which control messages are passed between so-called network control points. Control points (CP) characterize the functionality in network nodes that provide network services, such as route calculation. Among other functions, network nodes serve end nodes for locating resources and calculating routes, among other things. End nodes are nodes of lesser capability and typically include such things as user workstations, printers, and the like.

Users of IBM's SNA architecture and APPN architecture have a large investment in a type of end node called a dependent logical unit (DLU). A DLU is an end node device that, unlike an independent logical unit, does not have the ability to initiate sessions and to manage log on requests to server nodes. Instead, DLUs rely on other nodes to provide these services on its behalf via the CP capability. Because of their limited capability, DLUs are cheaper than end nodes that have full capability to initiate and manage sessions to other nodes. DLUs are supported in APPN by a mechanism called a dependent LU requester (DLUR) and dependent LU server (DLUS). Essentially, a session pipe is established between a CP DLUS node (a network node) and a DLUR node that owns (serves) the DLUs. Once a communication pipe called a CP-SVR pipe has been activated between the DLUR and DLUS, DLU message flows are encapsulated over sessions contained within the CP-SVR pipe between the DLUR and the DLUS. Numerous IBM publications describe APPn and DLUS/DLUR operation in detail. Many of these publications are available at IBM's Redbook web site http://www.redbooks.ibm.com. At this site, see for example the Redbook SG24-4656-01, May 29, 1998, Subarea to APPN Migration: VTAM and APPN Implementation.

The APPN architecture also allows users to configure an APPN network as an upstream component connected by a wide area network (WAN) to downstream components. The downstream components are typically local area networks (LANs). The mechanism that allows this configuration is called a branch extender (BEX) node. The nodes downstream of the BEX are usually end nodes and are considered to be within the domain, or branch, of the BEX. To these domain nodes, the BEX node looks exactly like an APPN network node that serves the branch nodes. To upstream nodes, the BEX node looks exactly like an APPN end node. Thus, a BEX node has an upstream node that acts to it as a serving network node.

More detailed information regarding APPN branch extenders is also available at web site http://www.redbooks.ibm.com. See, for example, the Redpiece article BRAN-CHXX, Jun. 1, 1997, APPN Branch Extender (BX), and the Redbook article SG24-5232-00, Oct. 10, 1998, IBM eNetwork Communications Server for Windows NT Version 6.0 Enhancements, both available at this web site.

While a BEX node knows the topology of its branch, it knows nothing of the upstream network topology. When a BEX node can't resolve a request for network services locally, it refers the request to its network node. This can be thought of as default routing. As far as upstream nodes are concerned, everything in the branch of the BEX node resides in the BEX node. The BEX node, when necessary, provides pass-through to its branch nodes for locate requests, session binds and unbinds, and the like. A BEX node registers all branch resources with its serving network node, including those that reside on the BEX node itself as well as those that reside on served end nodes. When registering the branch resources, the BEX node indicates that it is the EN control point (CP) for all resources it registers, even when those resources actually reside on a different end node. When sending or responding to directory searches, the BEX node modifies the directory search so that it includes the BEX nodes trunk vectors prior to sending the directory search into the WAN.

A BEX node provides information to the upstream network consistent with its end node appearance in that network. For directory services purposes, a BEX appears to own all of its branch resources. For route selection purposes, the BEX appears to be the origin or destination of all sessions involving logical units (LUs) in the branch of the BEX. For session routing, the BEX modifies bind messages destined for an end node of the BEX branch before the branch node ever sees it, by inserting the missing hop between the BEX and the branch node.

Branch extenders are very useful, in ways not important for this discussion, to provide network users with a flexible and inexpensive way to connect LANs and WANs in an APPN environment. DLU support is also very important to network users. It is also important to users to combine the advantages of BEXs and DLUS/DLUR in a single network. However, this combination introduces a major obstacle to network users. In the prior art, the DLUR support for DLUs must reside in a BEX node. Because a BEX appears as an end node to the upstream network, it is required to provide the DLUR capability for all of its branch nodes. The result is that only the BEX that is closest to the upstream WAN may support DLUR. On the other hand, the advantages of DLUS/DLUR are optimized when the DLUR function is located as close to a supported DLU as possible. In many cases, this is downstream of a BEX. Customers that presently have the DLUR located near the DLUs and who wish to install an upstream BEX to obtain other advantages are required to change their network configuration to relocate the DLUR support to the BEX.

A number of other problems also exist in locating DLUR support downstream of a BEX. A DLUS ordinarily calculates routes to a DLUR during operations relating to DLU support. A DLUR ordinarily registers with a DLUS its trunk group (TG) vector information necessary to calculate the routes to its DLUs. TG vector information contains the link addresses for all DLUs connected to a DLUR. However, a BEX provides isolation between an upstream DLUS node and the branch nodes of the BEX. Because of this, the DLUS node cannot calculate routes to the branch end nodes of the BEX. This means that a DLUS cannot calculate routes to a DLUR that resides downstream of a BEX. Another problem occurs because all branch nodes of a BEX are considered by a BEX to reside on the BEX. However, in a DLUS/DLUR environment, a DLUR registers with the DLUS as the owner of DLUs. In response to a resource Locate search request in a network containing both a BEX and DLUS/DLUR support, then both the BEX and the DLUR may appear in different ways to the Locate request as the owner of the resource that is being located. This, of course, can cause major malfunction of the network.

SUMMARY OF THE INVENTION

The invention resides in a method and apparatus that allows the DLUR function to reside in an end node served by a branch extender node in an APPN network. Two problems are solved by the invention that allows the DLUR support to be located downstream of a BEX. First, in an APPN network, when the DLUS and the DLUR reside in the same APPN network (a network in which all network nodes share topology information) and are separated by a BEX, the BEX provides isolation between the DLUS and the DLUR such that the DLUS cannot calculate routes to the DLUR. Second, a way must be found to avoid the problem of having both the DLUR and the BEX report ownership of a DLU.

The first problem is overcome by the invention by forcing the DLUS to view the DLUR as residing in a different network, even though this is not the reality. This forces the DLUS to initiate a resource Locate search request to determine routes to the DLUR. The DLUS is made to view the DLUR as being in a different network by having the BEX set a fictional network boundary crossed indication in Locate request messages passed between the DLUS and DLUR when control communication paths are first established between the DLUS and the DLUR. Then for all subsequent session setup requests to a DLU served by the DLUR, the DLUS treats the DLUR as being in a different network for which it has no network topology information, and causes it to initiate a Locate request to find a path to the DLUR.

The second problem is solved by having a BEX examine every resource Locate request or resource Locate reply to determine if the resource is a DLU. If it is, then the BEX is instructed not to substitute itself as the owner of the resource in Locate requests and responses. Two conventional fields in resource Locate and resource reply messages allow this determination. If both an Owning Control Point Respond (OCR) indicator and a DLUS served LU (DLS) indicator are set in the message, then the resource is a DLU served by a DLUR and the BEX does not substitute itself as the resource owner in this instance.

DETAILED DESCRIPTION

Dependent logical units (DLUs) are supported in an APPN network by a dependent logical unit server (DLUS) network node and a dependent logical unit requester (DLUR) node to which the DLUs are connected. The DLUR may be a network node or an end node. A special communications path, referred to as a control point-server (CP-SVR) pipe, is established between the DLUS and the DLUR. Control messages are transmitted over this pipe to locate a path to a DLU in response to a request from a DLU to establish a session with an application at another node or a request by an application at another node to establish a session with the DLU. The node containing the application is eventually provided information to allow it to calculate a route to the DLUR serving the DLU. The CP-SVR pipe consists of two LU 6.2 sessions between the DLUS and DLUR nodes. These sessions are similar to the control point to control point (CP-CP) sessions between adjacent APPN control points. The CP-SVR pipe sessions use a special class of service name, CPSVRMGR to identify themselves as DLUS/DLUR sessions.

Figure 1:
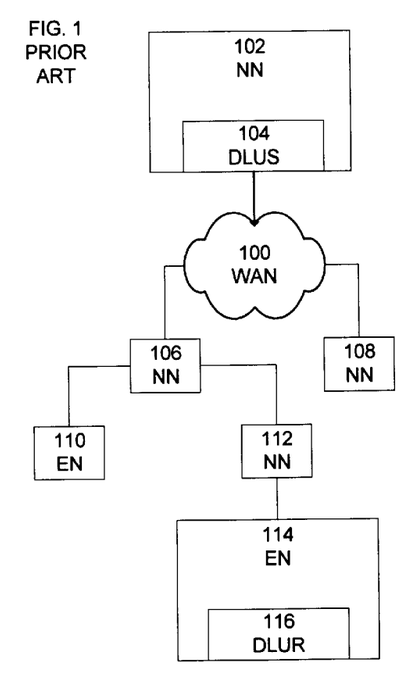
FIG. 1 illustrates a prior art APPN network containing DLUS/DLUR nodes for supporting dependent logical units (DLUs)
Figure 2:
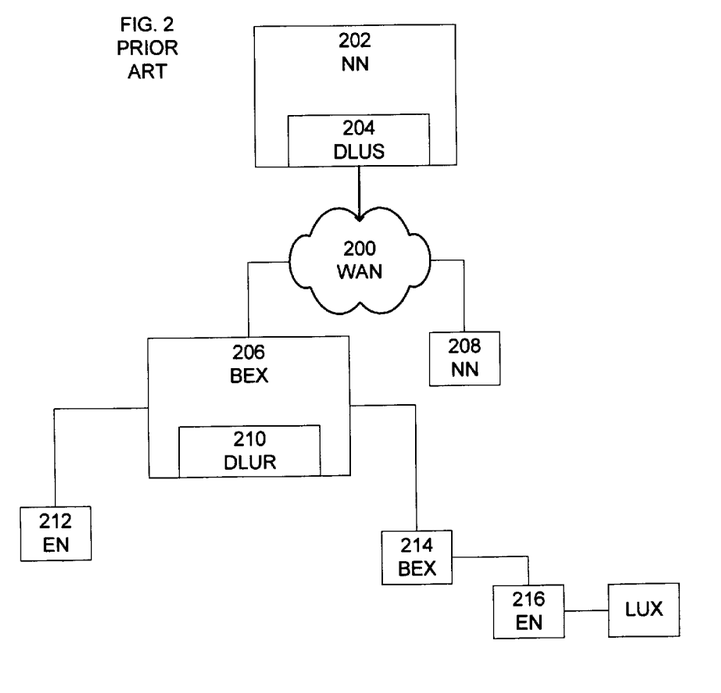
FIG. 2 illustrates a prior art APPN network containing branch extender (BEX) nodes.
Figure 3:
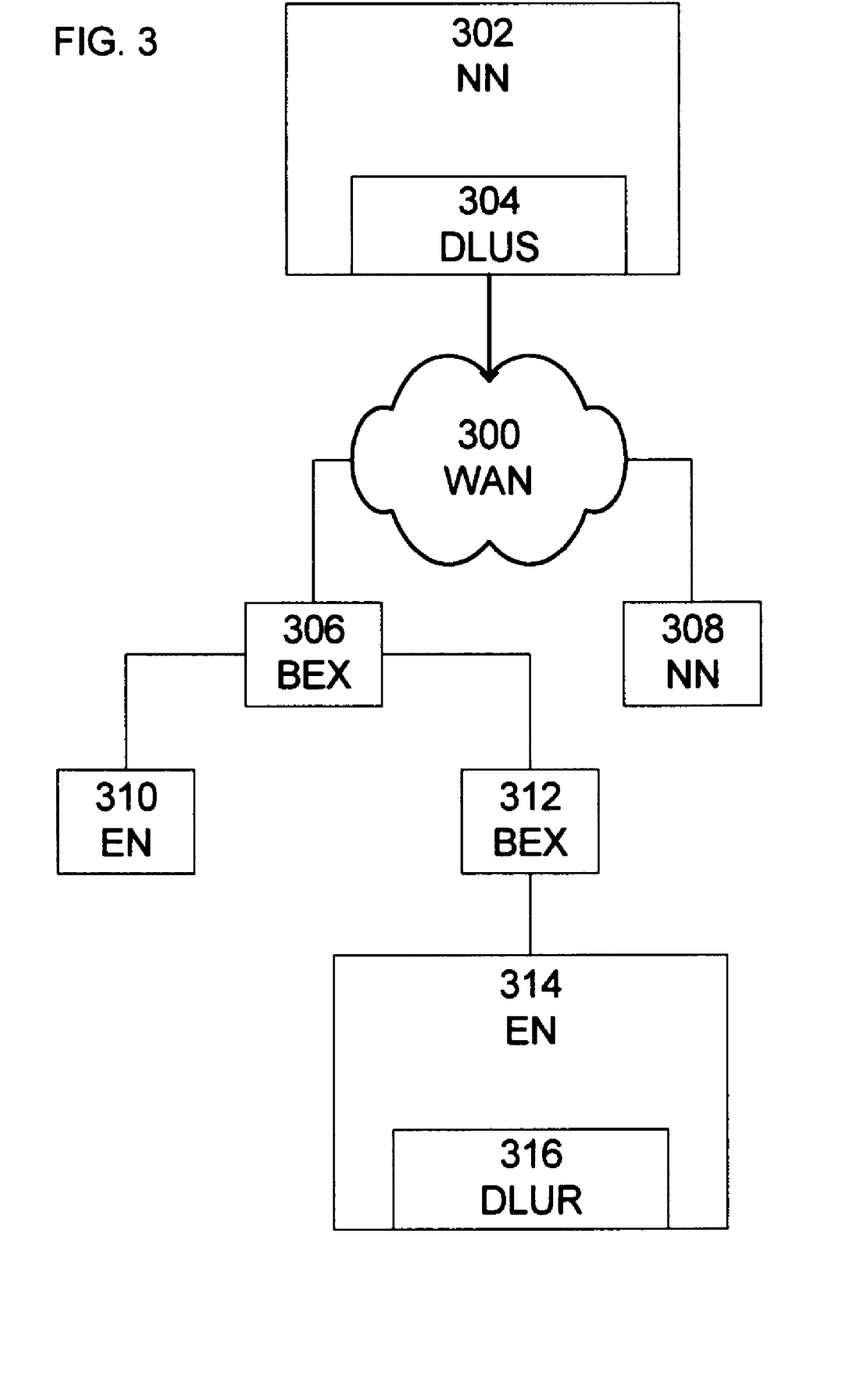
FIG. 3 illustrates an APPN network in which BEX nodes are combined with DLUR support located downstream of a BEX. This Fig. is used to describe both the problem and the solution of the invention.
Figure 4:
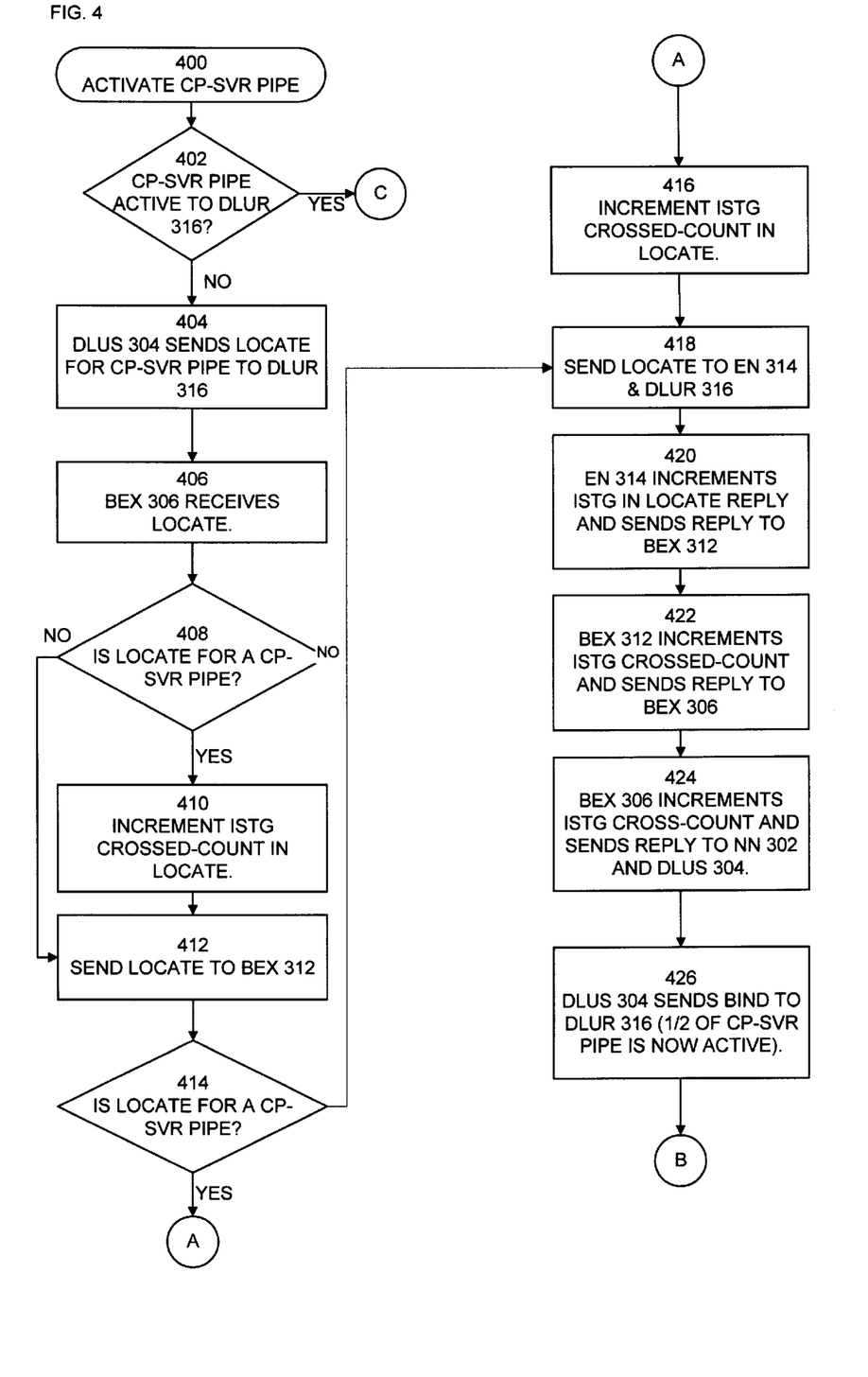
FIGS. 4 and 5 show illustrative flowcharts of the operations performed by the invention in establishing a CP-SVR pipe between DLUS and DLUR nodes in the network of FIG. 3.

FIGS. 1 through 3 explain the support of DLUs and BEXs in an APPN network and illustrate the problem addressed by the invention. FIG. 1 illustrates a prior art APPN network, including basic DLUS/DLUR support for DLUs. FIG. 1 shows a wide area network (WAN) 100. Upstream of WAN 100 is a network node (NN) 102, which, by way of example, is indicated to contain the DLUS function 104. Downstream of WAN 100 are a number of NNs, such as NN 106, 108 and 112, and ENs 110 and 114. EN 110 is served by NN 106. EN 114 is served by NN 112. EN 114 contains DLUR support 116. DLUR 116, along with DLUS 104, supports one or more DLUs connected to EN 114. These DLUs are not shown to simplify the drawing.

Before the DLUs can be supported, the CP-SVR pipe between NN 102 and EN 114 must be activated. To do this, the DLUS 104 sends a resource Locate search request to find the DLUR 116. The operation of the Locate function in an APPN network is explained in detail in U.S. Pat. No. 4,914,571. The Locate search request includes a special class of service name CPSVRMGR, indicating the search request is being sent as part of CP-SVR pipe activation. The Locate search request is received by NN 112, which is the NN server for the DLUR EN 114. NN 112 forwards the Locate search request to DLUR EN 114. EN 114 responds to NN 112 with a positive response to the Locate search request. NN 112 then sends a positive Locate reply to the DLUS NN 102. Upon receiving the Locate reply, DLUS NN 102 sends a BIND for a CPSVRMGR session to the DLUR EN 114. The DLUR EN 114 responds with a positive BIND response. At this point, one half of the CP-SVR pipe is active. The DLUS NN 102 can now send a conventional request over this half of the pipe to EN 114 to activate a physical unit (PU) which manages the DLUs.

After the PU on EN 114 is activated, EN 114 needs to return a positive activation response to NN 102. However, to do this, EN 114 must first activate the second half of the CP-SVR pipe. To do this, EN 114 sends a Locate search request to NN 112 to find its DLUS. The Locate request includes the CPSVRMGR class of service name, indicating that the search request is sent as part of CP-SVR pipe activation. NN 112 forwards the request to the DLUS NN 102 in the conventional way as described in U.S. Pat. No. 4,914,571. NN 102 responds to the search request with a positive reply, which is returned to NN 112. Upon receipt of the reply, NN 112 calculates a session route from the DLUR EN 114 to the DLUS NN 102. NN 112 returns a positive Locate reply to DLUR EN 114 and includes the session route just calculated in the reply. The DLUR EN 114 uses this session route to send a BIND request for a CPSVRMGR session to DLUS NN 102. The CP-SVR pipe is now fully active and the PU at EN 114 that manages the DLUs is also fully active.

Once the CP-SVR pipe is active, the DLUS can activate dependent LUs (DLUs) which are managed by the DLUR. To activate a DLU, the DLUS sends an activate LU message to the DLUR over the CP-SVR pipe. The DLUR responds to an activate message with a positive response, at which time the DLU is active. Upon receipt of the response, the DLUS registers the fact that the DLU is active and that the owning node for the DLU is the DLUR. This information is used during later LU-LU session activation between other applications in the network to the DLU, as discussed later in this disclosure.

After sending a positive response to an activate DLU message, the DLUR must also register the DLU with its NN server. The NN server for DLUR EN 114 is NN 112 in FIG. 1. By registering the DLU with its NN server, resources connected to the WAN 100 are able to locate the DLU and establish LU-LU sessions with it. DLUR 116 uses an APPN Register general data stream (GDS) variable to register the DLU with its NN 112. The Register GDS variable also identifies the DLUR 116 as the owning node for the DLU.

In the case of FIG. 1, it is important to note that both the activate LU response and the register GDS variable cause the same information to be registered in WAN 100; that is, a registration is made in DLUS 104 that the DLU resides on the DLUR EN 114. APPN requires that a given resource reside only on one node; APPN cannot tolerate a LU being registered as owned by two or more nodes. This is a source of one problem solved by the invention when a DLUR is located downstream of a branch extender node, as discussed in more detail below.

To calculate a route to DLUR EN 114 for communications with a DLU, it is sometimes necessary for the DLUR EN 114 to register its trunk group (TG) vectors with the DLUS NN 102. This is true, for example, when a DLUR and DLUS reside in the same APPN network and the DLUR is an EN, as in the case of FIG. 1. For purposes of this discussion, an APPN network is defined as a set of APPN NNs which share a common network topology database, and the ENs which are served by these NNs. The TG vectors are used for LU-LU session activation, which is discussed below. The important point is this registration at the DLUS of TG vectors for a DLUR only occurs when the DLUR and DLUS are in the same network. Both the DLUR and DLUS learn whether they are in the same network during the activation of the CP-SVR pipe. A resource Locate search, on both the request and reply, contains a special field, which identifies the number of APPN network boundaries that have been crossed as the search or reply message propagates through a network and between networks. An APPN network boundary is defined as a TG between a pair of APPN networks that do not share a common network topology database. As a resource Locate search traverses this boundary, the special field in the locate search message is incremented. At the destination of the requests or replies, if the field is zero, no network boundary has been crossed and the source and destination nodes are considered to be in the same network. If the field is non-zero, at least one network boundary has been crossed and the nodes are considered to be in different networks.

The manner in which a LU-LU session is established from an application at some node in the network to a DLU is now discussed for the prior art arrangement of FIG. 1. Once a DLU is active it can connect to other applications in the network. This is accomplished by having the DLUR send a logon request to the DLUS over the CP-SVR pipe. This request indicates that a DLU wishes to establish a session (i.e., logon to) an identified application. In FIG. 1, assume that the other application resides on NN 108. The DLUS sends a resource Locate search request into the network, which eventually finds it way to NN 108, to find the application. Included in the resource Locate search request is information about the DLU that is attempting to logon to the application. The information registered about the DLU by NN 112 when the activate LU response was received over the CP-SVR pipe is used when sending the Locate search request, and includes the DLUR 116 as the owning node. The Locate search also includes the DLUR TG vectors registered with the DLUS by the DLUR 116 over the CP-SVR pipe.

When NN 108 receives the Locate request, it calculates a session route to the owning node, which in this case is the DLUR 116. NN 108 uses both the network topology database and the DLUR TG vectors included in the Locate search to calculate the session route. The network topology database includes all connections between NNs in the APPN network, but does not have any information about TGs between two ENs or between a NN and an EN. The DLUR TG vectors contained in the Locate search contains all TGs from the DLUR 116 to other ENs and from the DLUR to other NNs. By using both the DLUR TGs and the network topology database, NN 108 is able to calculate a route from itself to the DLUR 116. NN 108 send a BIND to the DLUR 116 using the calculated session route. The DLUR responds with a positive BIND response, and the LU-LU session between the application and the DLU is established.

FIG. 2 shows a prior art APPN network that is augmented with branch extender (BEX) nodes. BEX nodes allow WANs and LANs to be included in the topology database of an APPN network, while at the same time providing isolation between the WAN and the LANs. Isolation is accomplished because the BEX acts as the owner (the residence) of all resources contained within its domain (its branch of the network). This allows great flexibility of network configuration for users of APPN networks. APPN supports a form of data transmission called high performance routing, or HPR. Most HPR network control messages are restricted to network nodes, rather than end nodes, such as front end processors, routers, or communications servers that direct traffic in the network. Prior to BEX nodes, any node that routed HPR data between other nodes was required to be a network node, and to send and receive such network control messages. Since a BEX node is a hybrid network node and end node, the BEX node is able to route HPR data between other nodes like a network node. Since the WAN views the BEX node as an end node the BEX node does not exchange topology information with the WAN and only processes directory searches for resources in its branch like an end node. This reduces the processing overhead for a BEX node while allowing data to be routed through the BEX node. FIG. 2 shows a NN 202 upstream of a WAN 200. Various nodes are located downstream of the WAN, such as NN 208 and other nodes. In particular, a BEX node 206 is connected to the WAN 200 and is shown as also containing DLUR 210. A cascaded BEX is shown at 214, which serves EN 216. A cascaded BEX is one whose NN server in the WAN is also a BEX. The cascaded BEX poses as an EN to its NN BEX. The NN BEX poses as a NN to the cascaded BEX. The only difference between a non-cascaded BEX and a cascaded BEX is that a non-cascaded BEX supports a DLUR, whereas a cascaded BEX does not. In the example arrangement of FIG. 2, DLUR 210 supports any DLUs in the branch of BEX 206, which includes DLUs connected to EN 212 and EN 216.

A BEX node filters out network control messages that are unnecessary to the network branch below the BEX node. Technically, to nodes within its branch, a BEX node poses as a network node (NN) and it may contain DLUR support. At the same time it poses as an end node (EN) to computers upstream of the WAN 100.

The following describes how resources in a branch of a BEX are registered with the BEX. After activating CP-CP sessions, an EN, whose NN server is a BEX, performs normal APPN functions, such as registering resources with the BEX that are owned by the EN. In FIG. 2, EN 216 registers all local resources with its NN server, BEX 214. These resources, sent to the BEX in a Register GDS variable, consist of EN 216 (the CP name of EN 216) and any local LUs contained in EN 216. If it is assumed that EN 216 contains one LU identified as LUX (not shown), the Register GDS variable contains two registration resources, EN 216 and LUX. The owning CP in the Register GDS variable is EN 216. The Register GDS variable looks like:

Owning node=EN 216, Resources=EN 216, LUX

BEX 214 then activates a CP-CP session with its NN server BEX 206. BEX 214 registers its CP name with BEX 206, as well as all its local resources with BEX 206. In FIG. 2, BEX 206 has no local resources, so only its CP name, BEX 206, is registered. BEX 206 also registers all resources located on its branch ENs. In FIG. 2, EN 216 has registered two resources, EN 216 and LUX, with BEX 214. BEX 214 includes these resources when it registers with BEX 206. However, BEX 206 alters the resource hierarchy so that it appears as the owning node for all of these resources. This requires that the node containing the DLUR function be located adjacent to the WAN 200. This is another important point in that it becomes another problem solved by the invention when a network is configured having DLUR support located near the actual DLUs being supported. In the present case, the register GDS variable looks like:

Owning node=BEX 214, Resources=BEX 214, EN 216, LUX

When BEX 206 activates its CP-CP session with its NN server 202, it also performs resource registration with NN 202. BEX 206 also registers all resources that have been registered by its branch ENs as well. The Register GDS variable looks like:

Owning node=BEX 206, Resources=BEX 206, BEX 214, EN 216, LUX

Once this Register GDS variable is sent, all nodes in the WAN are able to locate resources in the branch network downstream of BEX 206.

One key point in Branch Extender resource registration is that the owning node is always the node which is sending the Register GDS variable. The APPN architecture requires an EN to register only resources that reside on that EN. As a result, APPN does not allow an EN to register a resource which has an owning node other than the EN which sends the Register GDS variable.

In FIG. 2, assume that LUX wishes to establish a session to an application that resides on NN 208. To do this, LUX must first obtain a session route. This is accomplished by sending a Locate search into the APPN network. On behalf of LUX, EN 216 sends a Locate search to its NN server, BEX 214, requesting a session route from EN 216 to the node on which the application resides. Because EN TG vectors are not part of the APPN network, EN 216 must include all TG vectors for which it is an endpoint in the Locate search so that they may be used in calculating the session route.

When BEX 214 receives the search it does not know the location of the application. Since BEX 214 is a Branch Extender, it sends a Locate search to its NN server BEX 206 requesting a session route from BEX 214 to the node that owns the application. When sending the Locate search, BEX 214 alters the origin LU resource hierarchy for LUX so that BEX 214 appears as the owning CP for LUX. This causes one of the problems solved by the invention, namely of creating the possibility of two nodes reporting ownership of a DLU when the DLUR is located downstream of a BEX. BEX 214 also removes all TG vectors included by EN 216 from the Locate search and replaces them with TG vectors for which BEX 214 is an endpoint. These two changes are necessary so that BEX 206 can calculate a session route from BEX 214 to the node on which the application resides.

When BEX 206 receives the search it also does not know the location of the application. Like BEX 214, BEX 206 is a Branch Extender and must modify the Locate search before sending it into the WAN. BEX 206 changes the origin LU resource hierarchy for LUX so that BEX 206 appears as the owning CP for LUX. BEX 206 also removes all TG vectors included by BEX 214 from the Locate search and replaces them with TG vectors for which BEX 206 is an endpoint.

NN 202 eventually receives the Locate request and performs existing APPN search logic and successfully finds the application on NN 208. NN 202 calculates a session route from BEX 206 to NN 208 using the network topology database and the TG vectors provided by BEX 206 on the Locate search request. NN 202 returns the session route in the Locate reply sent to BEX 206. The session route returned to BEX 206 looks like:

BEX 206—NN 202—NN 208

Upon receipt of the positive Locate reply, BEX 206 calculates a session route from BEX 214 to BEX 206 using the TG vectors provided by BEX 214 on the Locate search request. BEX 214 then prepends this session route to the one it received and returns the modified session route to BEX 214 in the Locate reply. The session route now looks like:

BEX 214—BEX 206—NN 202—NN 208

BEX 214 performs logic similar to BEX 206. BEX 214 calculates a session route from EN 216 to BEX 214 using the TG vectors provided by EN 216 on the Locate search request. BEX 214 then prepends this session route to the one received from BEX 206 on the Locate reply and sends this session route to EN 216 on the Locate search reply. The session route now looks like:

EN 216—BEX 214—BEX 206—NN 202—NN 208

EN 216 uses this session route to send a BIND request to the application that resides on NN 208.

The above discussion focused on prior art DLU support and the use of branch extenders in the APPN architecture. In the prior art described above, only the BEX node "closest" to the WAN (BEX 206) can provide DLUR support. That is, only a BEX whose NN server is not another BEX can be a DLUR. A BEX enforces this restriction by not allowing the CP-SVR pipe to be established between a DLUR in the branch and a DLUS in the WAN. This is accomplished by sending a negative reply to any Locate search request for the CPSVRMGR mode, which is used exclusively for CP-SVR pipes.

When an attempt is made to provide DLUR support in a BEX that is not the closest BEX to the WAN, the problems mentioned above arise. FIG. 3 shows an attempt to combine FIG. 1 and FIG. 2, and illustrates these problems addressed by this invention. FIG. 3 shows a NN 302 upstream of the WAN 300 and containing the DLUS function 304. Downstream of the WAN 300 is a NN 308 and a BEX 306. Connected to BEX 306 are EN 310 and a cascaded BEX 312. BEX 312 is connected to EN 314, which contains the DLUR function 316. Contrary to the example of FIG. 2, the DLUR 316 is located downstream from the Branch Extender 306 that is closest to the WAN 300.

The first problem that arises is that a BEX explicitly disables activation of a CP-SVR pipe between the downstream DLUR 316 and the DLUS 304. To understand why, assume that BEX 306 allows the CP-SVR pipe to be activated between DLUR 316 and DLUS 304. Since the DLUR is in EN 314 and is in the same APPN network as the DLUS 304, the DLUR 316 registers its TG vectors with the DLUS once the CP-SVR pipe is activated. Thereafter, during session activations, nodes upstream of the WAN 300 will attempt to use the network topology database and these TG vectors to calculate routes to the DLUR 316. However, since the DLUR 316 is not attached directly to WAN 300, none of the TG vectors point to any node which can be reached directly from the WAN 300. Therefore, no LU-LU session can be established between a DLU supported by the DLUR 316 to an application upstream of WAN 300.

A second problem with downstream DLUR support for BEX nodes concerns resource registration in the BEX NN server and in the DLUS function. As mentioned previously, an activate LU response causes the DLU to be registered at the DLUS 304 with the DLUR 316 as the owning node. The DLUR 316 also registers the DLU with its NN server BEX 312 and BEX 312 with its NN server BEX 306. As the Register GDS variable is processed by the BEX 306, BEX 306 modifies the resource hierarchy so that it appears as the owner for the DLU resource being registered. Thus, the DLU appears to reside on the BEX closest to the WAN, which in this case is BEX 306. However, the DLU has also been registered with the WAN during activate LU processing, as residing on DLUR 316. Thus, we have a resource defined in different ways as residing at different nodes of the network. This causes APPN nodes upstream of WAN 300 to be unable to locate the DLU using APPN search mechanisms.

One part of the solution to allow a successful Locate search for DLUR 316 is to force DLUS 304 to view DLUR 316 as residing in a different APPN network. When the DLUR and DLUS are in different APPN networks, the DLUR does not register its TG vectors with the DLUS. Instead, the DLUS sends a Locate search to obtain the necessary routing information to allow a session initiation request to be sent to the DLUR. This avoids one part of the problem.

To cause the DLUR and DLUS to view each other as residing in different APPN networks, in accordance with one aspect of the invention, a BEX modifies Locate search requests and replies for the CP-SVR pipe sent between the DLUR and DLUS. Locate searches contain a special field, known as the ISTG (inter-subnet trunk group) crossed-count, which specifies the number of APPN network boundaries which have been crossed as a Locate or Locate reply propagates. If the ISTG crossed-count is zero when a Locate request or reply arrives at its destination, then no network boundaries have been crossed and both nodes are in the same network. If the ISTG crossed count is non-zero, then at least one boundary has been crossed and the two nodes are in different APPN networks. When processing a Locate search that is part of CP-SVR pipe activation (the class of service name in the Locate search is CPSVRMGR), the invention causes a BEX to increment the ISTG crossed count. For all other Locate search requests the ISTG crossed count remains unaltered. As a result, both the DLUR and DLUS view each other as being in different APPN networks, but only for the purpose of CP-SVR pipe activation. For all other functions, both the DLUR and DLUS appear to be in the same APPN network. This, in turn, forces the DLUS to initiate Locate search requests for a DLUR downstream of a BEX, rather than erroneously using registered DLUR TG vectors. FIG. 3, viewed in conjunction with the flowcharts in FIGS. 4 through 8, illustrate the invention in more detail. Assume that DLUS 304 wants to activate a physical unit (PU) on DLUR 316 so that it might communicate with a DLU served by DLUR 316. DLUS 304 must first activate the CP-SVR pipe between itself and the DLUR 316. In step 402 of FIG. 4, DLUS 304 first determines if a CP-SVR pipe already is active to DLUR 316. Assuming that a CP-SVR pipe is not active, at step 404 DLUS 304 sends a Locate search request to find DLUR 316. The Locate request includes the CPSVRMGR class of service name, indicating that the search is being sent as part of CP-SVR pipe activation. The Locate request is received by BEX 306 at step 406. At step 408, BEX 306 determines from the CPSVRMGR class of 10 service that the request is for activating a CP-SVR pipe. As a result, at step 410, BEX 306 increments the ISTG crossed-count from 0 to 1 and forwards the Locate search to BEX 312 at step 412. BEX 312 also determines at step 414 that the search concerns activation of a CP-SVR pipe. As a result, step 416 increments the ISTG crossed count from 1 to 2. Step 418 sends the Locate search to EN 314 and DLUR 316. At step 420, DLUR 316 responds with a positive Locate search reply that is sent to BEX 312. For the same reason already discussed, at step 422, BEX 312 increments the ISTG crossed count in the Locate reply from 0 to 1 and forwards the reply to BEX 306. At step 424, BEX 306 also increments the ISTG crossed-connect from 1 to 2 and sends the Locate reply to NN 302 and DLUS 304. Upon receiving the Locate reply, at step 426, DLUS 304 sends a session BIND for a CPSVRMGR session to DLUR 316. DLUR 316 replies with a positive BIND response. At this point, one half of the CP-SVR pipe is active.

Figure 5:
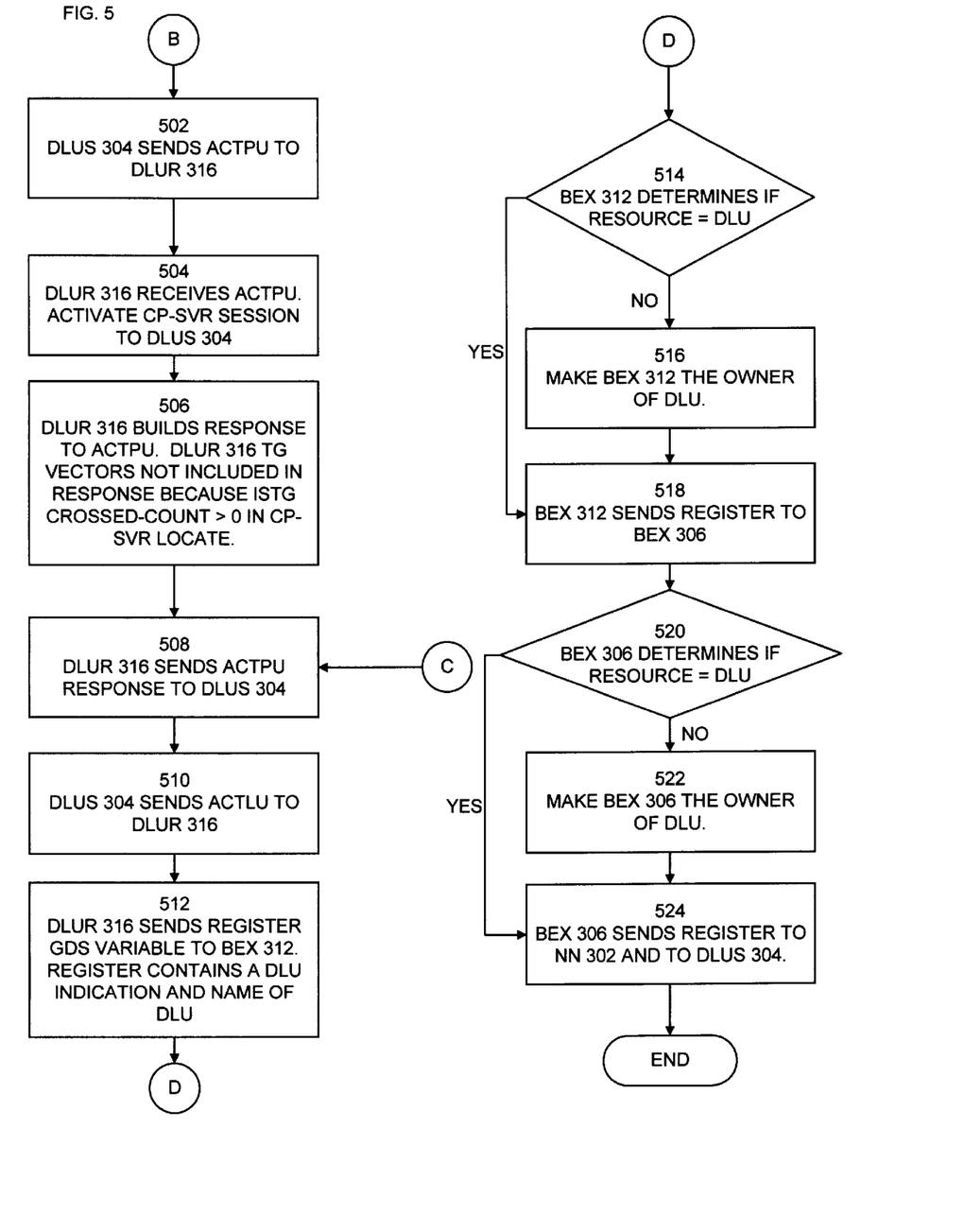

DLUS 304 is now able to send an activate PU command (ACTPU) over the half CP-SVR CPSVRMGR session to DLUR 316, which it does at step 502 of FIG. 5. DLUR 316 receives the ACTPU at step 504 and activates the PU. To respond to DLUS 304, DLUR 316 must first activate the second half of the CP-SVR pipe. As part of step 504, DLUR 316 sends a Locate search to BEX 312 to find DLUS 304. The Locate search includes the CPSVRMGR class of service name, indicating that the search request is being sent as part of CP-SVR pipe activation. BEX 312 increments the ISTG crossed-connect from 0 to 1 for reasons previously discussed and sends the Locate search to BEX 306. BEX 306 also increments the ISTG crossed-connect from 1 to 2 and forwards the request to NN 302 and DLUS 304. DLUS 304 responds with a positive Locate search reply. Upon receipt of the reply, BEX 306 increments the ISTG crossed-connect from 0 to 1 and forwards the Locate search reply to BEX 312. BEX 312 increments the ISTG crossed-connect from 1 to 2 and forwards the Locate reply to DLUR 316. DLUR 316 sends a BIND request for a CPSVRMGR session to DLUS 316. DLUS 316 responds with a positive BIND response, completing the activation of the second half of the CP-SVR pipe. The CP-SVR pipe is now fully active. Because the ISTG crossed-count on the earlier Locate for DLUR 316 was non-zero, indicating that DLUS 304 and DLUR 316 are in different networks, DLUR 316 does register its TG vectors following the activation of the CP-SVR pipe. DLUR 316, at step 506 now builds a positive response to the earlier ACTPU command. At step 508, DLUR 316 sends the ACTPU response to DLUS 304 and the DLUR 316 PU supporting DLUs served by DLUR 316 is fully active.

Now that the CP-SVR pipe between DLUS 304 and DLUR 316 is active, and the PU is active at DLUS 316, dependent LUs (DLUs) served by DLUR 316 can be activated. To activate a DLU, at step 510, DLUS 304 sends an ACTLU command to DLUR 316 over the CP-SVR pipe. The DLUR responds to the ACTLU with a positive ACTLU response, at which time the DLU is active. Upon receipt of the ACTLU response, DLUS 304 registers the fact that the DLU is active and that the owning node for the DLU is DLUR 316. This information is used during LU-LU session activation to the DLU, which is discussed later in this disclosure.

After sending the positive ACTLU response, DLUR 316 must register the DLU with its NN BEX 312. By registering, resources connected to WAN 300 are able to locate the DLU and establish LU-LU sessions with it. At step 512, DLUR 316 uses the APPN Register GDS variable to register the DLU with BEX 312. The Register contains an indication that the LU is a DLU and it also contains the name of the DLU. The Register identifies DLUR 316 as the owning node for the DLU. At step 514, BEX 312 determines if the resource is a DLU. Since in this example, it is, step 516 that would otherwise mark BEX 312 as the DLU owner is omitted. Step 518 forwards the Register to BEX 306 with DLUR 316 indicated as the owning node. At step 520, BEX 306 also determines if the resource is a DLU and since it is step 522, which would otherwise mark BEX 306 as the owner, is also omitted. Step 524 registers the DLU at DLUS 304 with DLUR 316 appearing as the owner.

Figure 6:
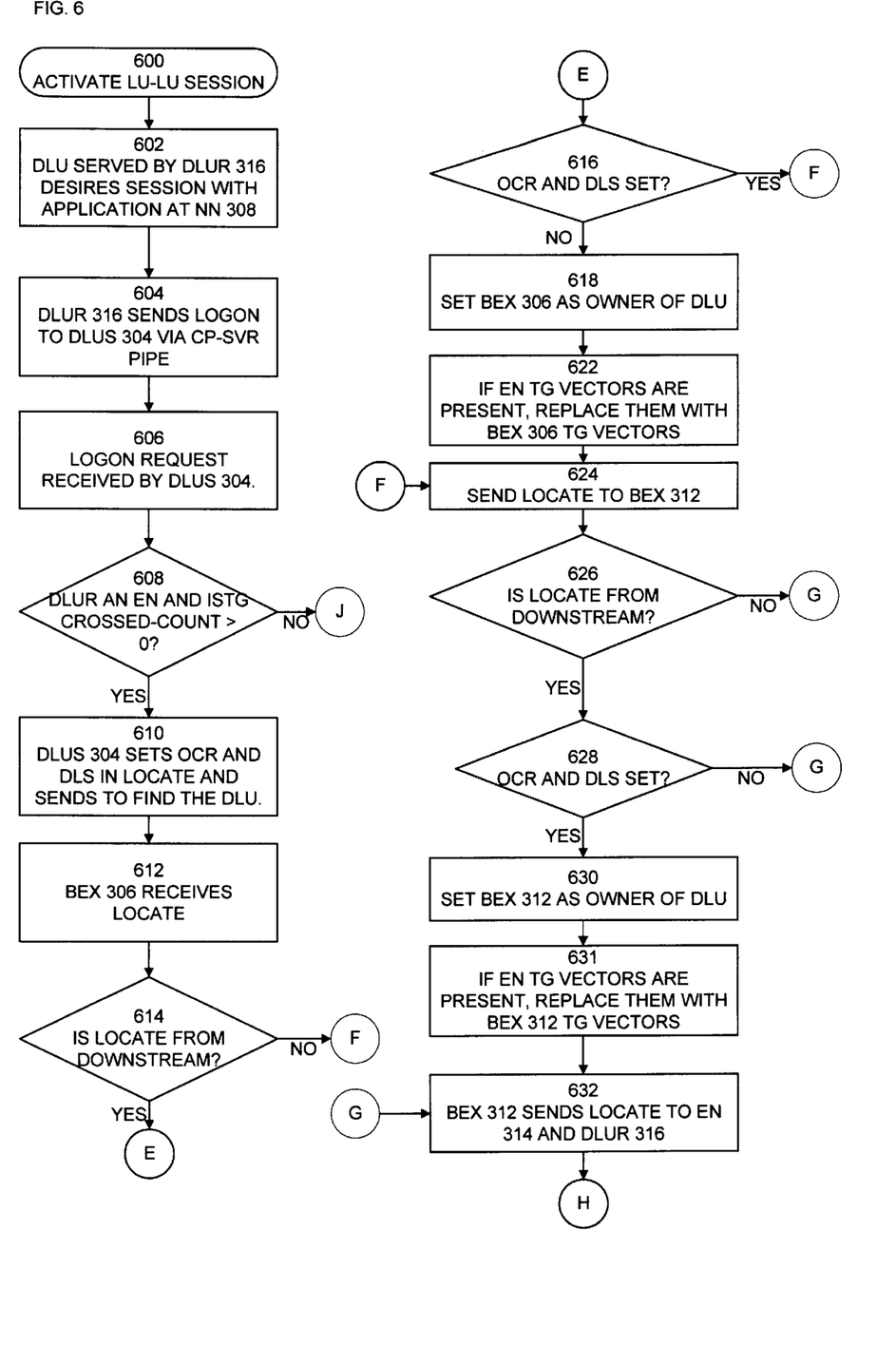
FIGS. 6 through 8 show illustrative flowcharts of the operations performed by the invention in establishing communication sessions with DLUs supported by the DLUR in the network of FIG. 3.
Figure 7:
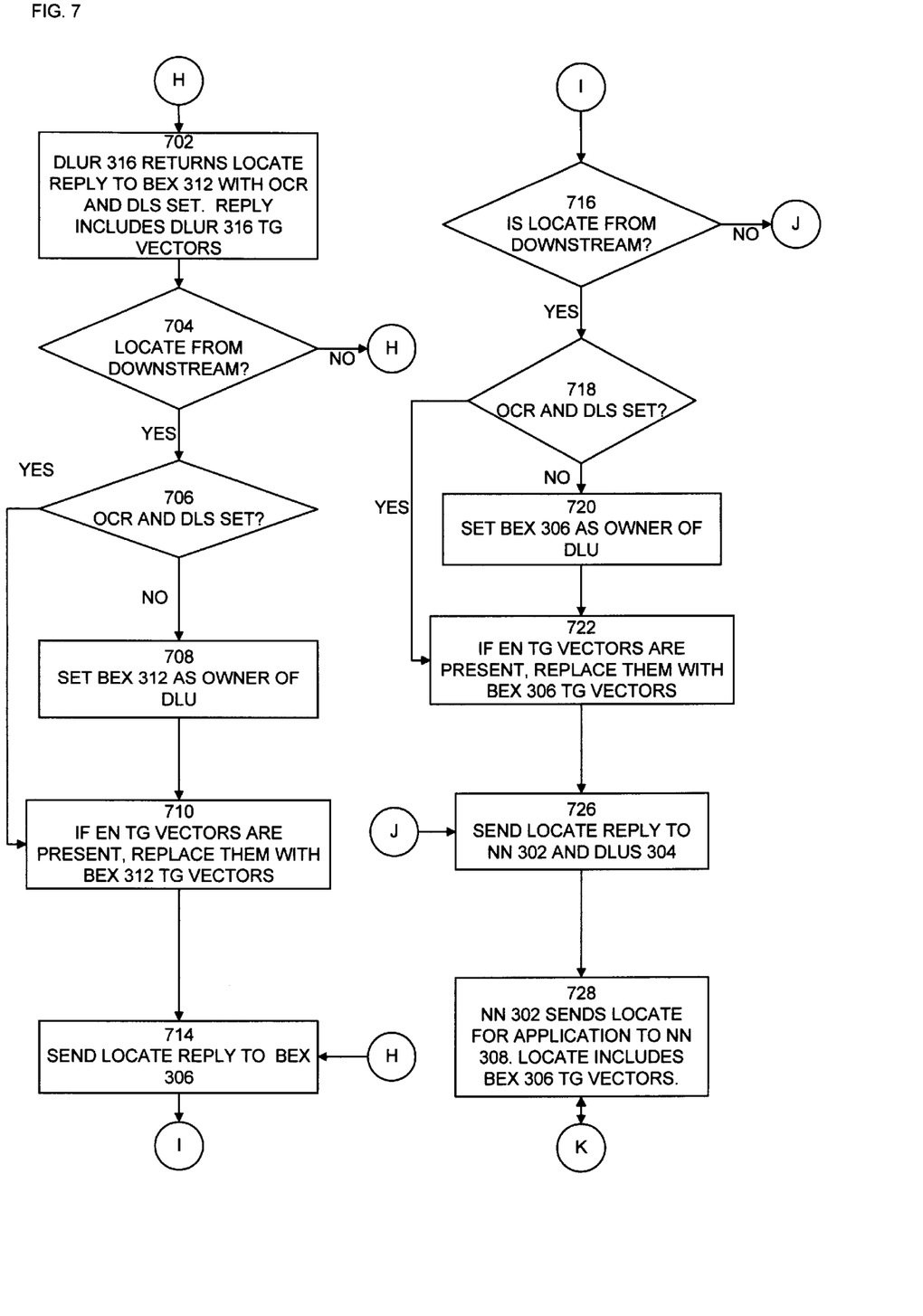
Figure 8:
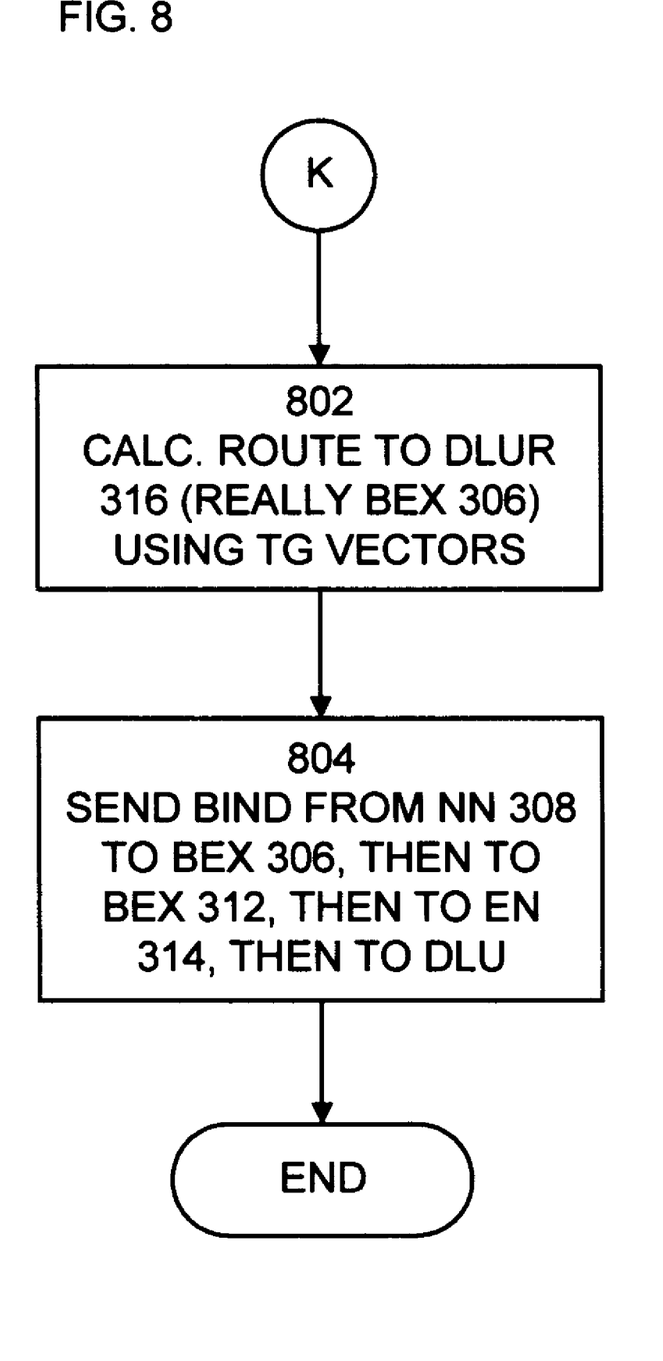

The flowcharts of FIGS. 6 through 8 illustrate operation of the invention when a DLU served by DLUR 316 wishes to establish a session with another application in the network, after being activated and registered as described above. Step 602 describes the situation that the DLU desires a session with an application that is assumed to reside at NN 308. To setup the session, at step 604 the DLU sends a log on request to DLUS 304 over the CP-SVR pipe, which is received by DLUS at step 606. Recall that when the CP-SVR pipe was established, the ISTG crossed-count was non-zero. Thus, step 608 causes DLUS 304 to treat DLUR 316 as being in a different APPN network. As a result, step 610 sends a Locate search request into the network to obtain routing information for DLUR 316 that can be used to calculate a session route from WAN 300 to DLUR 316. Both an Owning Control Point Respond (OCR) field and a DLUS Served LU (DLS) field are set in the Locate search request. The OCR and DLS fields are defined fields in the APPN architecture; when both are set, downstream BEX nodes receiving the Locate search command do not mark themselves as owner of the DLU as is normally done by BEXs. The Locate request is received by BEX 306 at step 612. Step 614 determines that the Locate request is not from a downstream node. In this case, there is no need for the BEXs to concern themselves with changing ownership of the resource searched for, so steps 616, 618 and 622 are omitted. Step 624 forwards the Locate request to BEX 312; BEX 312 merely forwards the request to DLUR 316 at step 632. The steps 628, 630, and 631 are not executed in this instance because step 626 determines that the Locate request is from an unstream node.

At step 702 of FIG. 7, in response to receiving the Locate request, DLUR 316 returns a positive Locate reply to BEX 312. The OCR and DLS fields are set in this reply to prevent the upstream BEX nodes from changing the ownership hierarchy as described above. The reply also includes the TG vectors for DLUR 316 so that DLUS 304 can eventually calculate a route to DLUR 316. At step 704, BEX 312 determines if the Locate reply request is from a downstream node. Since it is in this case, step 706 determines that both the OCR and DLS fields are set. This tells BEX 312 that this is a Locate reply for a DLU. As a result, step 708 is skipped so that BEX 312 does not modify the resource ownership hierarchy in the Locate reply as it would for an independent LU. This leaves DLUR 316 as the owning node in the resource hierarchy. At step 710, BEX 312 does replace the DLUR 316 TG vectors in the Locate reply with its own TG vectors, as it does for independent LUs. This is necessary so that DLUS 304 can calculate a route to DLUR 316. At step 714, BEX 312 forwards the Locate reply to BEX 306. When BEX 306 receives the Locate reply, step 716 determines that the message is from a downstream node. Thus, step 718 is executed and BEX 306 determines that both the OCR and DLS indicators are set in the reply. Since both indicators are set, BEX 306 realizes that this is a reply for a DLU. Just as discussed for BEX 312, step 720 is omitted so that BEX 306 does not modify the resource ownership hierarchy in the Locate reply. However, at step 722, BEX 306 does replace the BEX 312 TG vectors in the Locate reply with its own TG vectors. BEX 306 forwards the reply to NN 302 and DLUS 304 at step 726. At this point NN 302 sends a Locate search request at step 728 into the network to find the application that the DLU has requested. This Locate request contains both the TG vectors that NN 302 received from BEX 306 and an indication that this Locate request is initiated by a request from a DLU. The Locate request eventually finds its way to NN 308, which owns the application sought. Node 308 also determines from the DLU indication in the Locate request that it must send a BIND command to the DLU to establish communications. Therefore, at step 802 of FIG. 8, NN 308 uses the BEX 306 TG vectors contained in the Locate request to calculate a route to BEX 306. At step 804, NN 308 sends the BIND to BEX 308. The BIND identifies the DLU. BEX 306 is able to calculate a route to BEX 312 to the DLU and it forwards the BIND accordingly to BEX 312, which in turn calculates the remaining route to EN 314 and DLUR 316 and forwards the BIND. DLUR 316 contains the conventional functionality to now establish a session with the DLU, which DLUR 316 supports.

It is to be understood that the above described arrangements are merely illustrative of the application of principles of the invention and that other arrangements may be devised by workers skilled in the art without departing from the spirit and scope of the invention.

What is claimed:

1. In a peer-to-peer network comprising end nodes, network nodes which serve the end nodes for locating resources in the network and for calculating network routes, branch extender nodes which act as owners of all resources in a branch domain controlled by the branch extender node, and dependent logical units (DLUs) supported by a DLU server function at a DLUS network node of the network and by a DLU requester function at a DLUR node of the network, a method of locating the DLUR capability to a node within the branch domain of a branch extender node, comprising

- establishing a control point to Server (CP-SVR) communication pipe between the DLUS node and the DLUR node over which control messages are transmitted for supporting the DLUs served by the DLUR node,
- during establishment of the CP-SVR pipe, sending a fictional network indication to the DLUS node that the DLUR node is located in a different peer-to-peer network than the DLUS node,
- after establishment of the CP-SVR pipe, registering the DLUR node with the DLUS node as the owner of the DLUs served by the DLUR node,
- at the branch extender node, in response to a resource locate search request, determining if the request is to activate a DLU supported by the DLUR node, and
- if the request is not to activate a DLU supported by the DLUR node, registering with the DLUS node that the branch extender is the owner of the resource being located, and
- if the request is to activate a DLU supported by the DLUR node, registering with the DLUS that the DLUR node is the owner of the DLU.

2. The method of claim 1 wherein registering of the DLUR node as the owner of the DLU further comprises omitting the step of registering the branch extender as the owner of the resource.

3. The method of claim 1 further comprising

- at the DLUS node, initiating a resource locate request for the DLUR node in response to a request to establish a communications session between a DLU and an application at a node in the network, the locate search request being for the purpose of obtaining addressing information of network links connected to the DLUR node.

4. In a peer-to-peer network comprising end nodes, network nodes which serve the end nodes for locating resources in the network and for calculating network routes, branch extender nodes which act as owners of all resources in a branch domain controlled by the branch extender node, and dependent logical units (DLUs) supported by a DLU server function at a DLUS network node of the network and by a DLU requester function at a DLUR node of the network, apparatus for locating the DLUR capability to a node within the branch domain of a branch extender node, comprising

- means for establishing a control point to Server (CP-SVR) communication pipe between the DLUS node and the DLUR node over which control messages are transmitted for supporting the DLUs served by the DLUR node,
- means at the DLUS node for marking the DLUR node as located in a different peer-to-peer network than the DLUS node,
- means at the DLUS node for registering the DLUR node the owner of the DLUs served by the DLUR node,
- means at the branch extender node responsive to a resource locate search request for determining if the request is to activate a DLU supported by the DLUR node,
- means responsive when the request is not to activate a DLU supported by the DLUR node for registering with the DLUS node that the branch extender is the owner of the resource being located, and
- means responsive when the request is to activate a DLU supported by the DLUR node for registering with the DLUS that the DLUR node is the owner of the DLU.

5. The apparatus of claim 4 wherein the means for registering the DLUR node as the owner of the DLU further comprises means for disabling the means for registering the branch extender as the owner of the resource.

6. The apparatus of claim 4 further comprising

- means at the DLUS node for initiating a resource locate request for the DLUR node in response to a request to establish a communications session between a DLU and an application at a node in the network, the locate search request being for the purpose of obtaining addressing information of network links connected to the DLUR node.

7. In a peer-to-peer network comprising end nodes, network nodes which serve the end nodes for locating resources in the network and for calculating network routes, branch extender nodes which act as owners of all resources in a branch domain controlled by the branch extender node, and dependent logical units (DLUs) supported by a DLU server function at a DLUS network node of the network and by a DLU requester function at a DLUR node of the network, a method of locating the DLUR capability to a node within the branch domain of a branch extender node, comprising:

- registering the DLUR node at the DLUS node as being in a different network than the DLUS node,
- in response to a request received at the DLUS node to establish a communication session between an application at a node in the network and a DLU served by the DLUR node, determining if the DLUR is registered as being in the same network as the DLUS,
- in response to the registration of the DLUR as being in a different network than the DLUS, initiating a Locate search request for the DLUR from the DLUS node to obtain trunk addresses to the branch extender node,
- at the branch extender node, in response to a reply to the Locate search request, substituting in the reply trunk address vectors of the branch extender node for the DLUR node trunk address vectors and forwarding the reply to the DLUS node,
- sending the branch extender trunk address vectors to the node containing the application,
- calculating a network route to the branch extender node from the node containing the application using the branch extender trunk address vectors,
- transmitting a BIND command to the branch extender node, and
- forwarding the BIND from the branch extender node to the DLUR node to activate the communication session.

* * * * *